United States Patent [19]
Anderson

[11] 4,413,034
[45] Nov. 1, 1983

[54] RECORD HANDLER

[76] Inventor: Chester L. Anderson, 5712 Manor Rd., P.O. Box 12, Austin, Tex. 78723

[21] Appl. No.: 353,956

[22] Filed: Mar. 2, 1982

[51] Int. Cl.³ .................. B32B 3/00; B32B 27/00; D04H 1/58
[52] U.S. Cl. ...................... 428/172; 428/289; 428/64; 428/280; 428/282; 16/116 A
[58] Field of Search ............. 428/289, 286, 121, 172, 428/64, 280, 282; 16/116 A; 15/209 D

[56] References Cited

U.S. PATENT DOCUMENTS

| | | | |
|---|---|---|---|
| 580,148 | 4/1897 | Staples | 16/116 A |
| 2,069,449 | 2/1937 | Jensen | 15/209 D |
| 2,439,051 | 8/1948 | McGill | 428/286 |
| 3,414,673 | 12/1968 | Gewirz | 15/209 D |

*Primary Examiner*—George F. Lesmes
*Assistant Examiner*—Beverly K. Johnson

[57] ABSTRACT

A phonograph record disc handling device which includes a folded-over pad having a soft felt on its inner side for touching opposite sides of the disc when wrapped around an edge of the disc, and means to hold the pad firmly by a person when in use.

2 Claims, 10 Drawing Figures

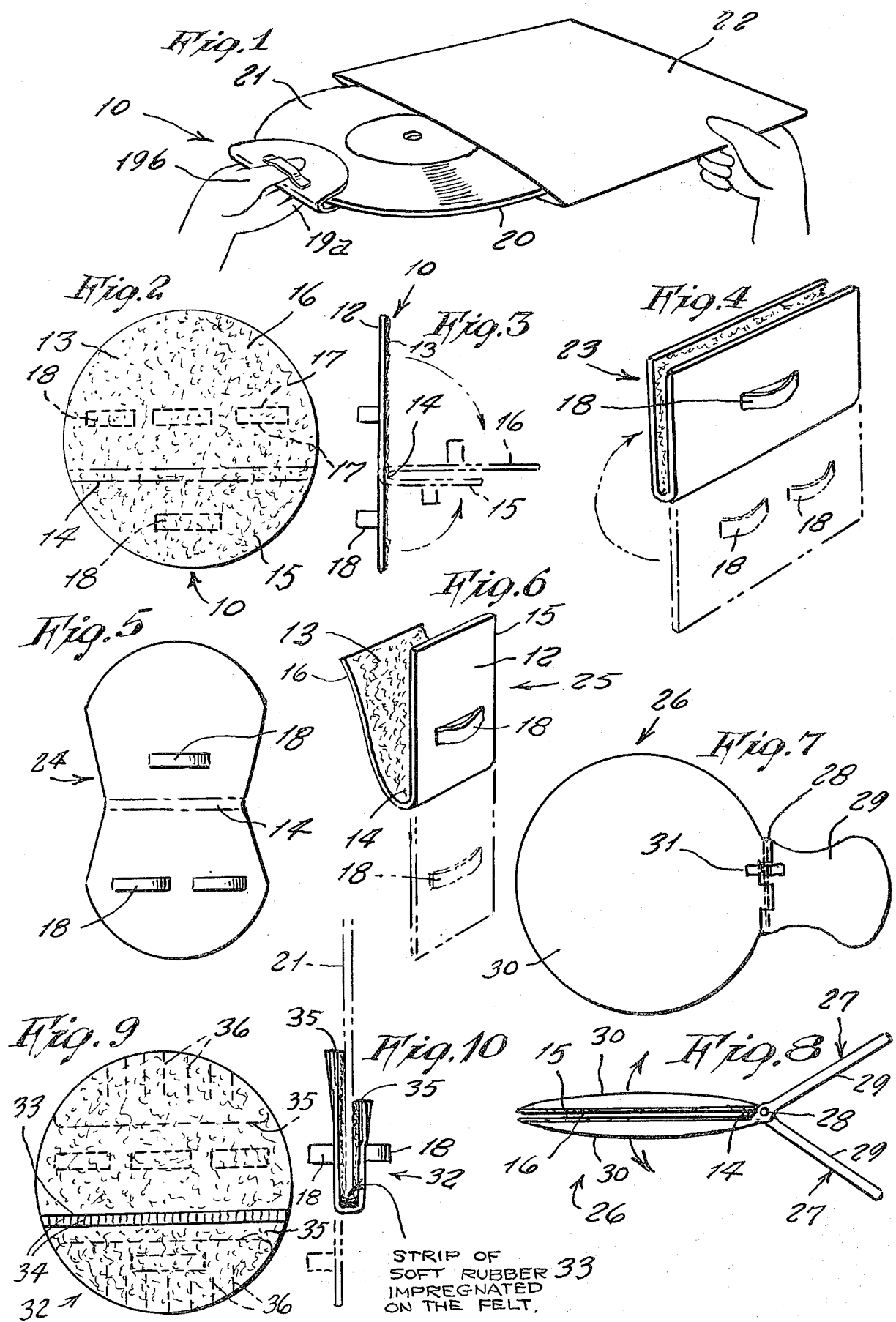

RECORD HANDLER

This invention relates generally to phonograph record accessories. More specifically, it relates to handling pads.

It is well known that the handling of phonograph records by a person's bare hands is objectionable, because grime and oil from a person's fingers can get into the fine microgrooves of the record, and thus clog the grooves with a grit that will quickly wear down the groove contour, so that the fine musical sound thereof is destroyed. Thus, there is a need for the handling of phonograph record discs in a cleaner manner when being transferred between the record album envelope and the record player turntable.

Therefore, it is a principal object of the present invention to provide a phonograph record disc handling device, which is a soft pad wrapped around an edge of the record disc, and which may be grasped by a person's hand, so that the hand does not directly contact any part of the record disc, thus preventing transfer of finger grime or oil to the disc microgrooves.

Another object is to provide a record handler, which includes finger straps, so as not to fall out of a person's hand, and which, in one design thereof, additionally includes friction means, so as to prevent the record disc from slipping out of the pad.

Other objects of the present invention are to provide a record handler, which is simple in design, inexpensive to manufacture, rugged in construction, easy to use and efficient in operation.

These, and other objects, will be readily evident upon a study of the following specification and the accompanying drawing wherein:

FIG. 1 is a perspective view of one design of the invention, shown in operative use;

FIG. 2 is an inner side view of the design shown in FIG. 1;

FIG. 3 is a side edge view thereof;

FIG. 4 is a perspective view of a square-shaped design of the invention;

FIG. 5 is an outside elevational view of yet another design;

FIG. 6 is a perspective of a two-finger design of the invention;

FIG. 7 is a side view of still another design, which includes handles for being pivoted open or closed;

FIG. 8 is an edge elevational view thereof;

FIG. 9 is an inner side view of yet a further design, that includes a rubber pad for bearing frictionally against an edge of the record, and FIG. 10 is an edge elevational view thereof, shown in use.

Referring now to the drawing in greater detail, and more particularly to FIGS. 1, 2 and 3 thereof, at this time, the reference numeral 10 represents a record handler, according to the present invention, wherein there is a circular-shaped pad, made of a layer of plastic vinyl 12 and a layer of soft felt material 13, which are adhered or bonded together by a suitable adhesive means therebetween. A fold line 14 extends across the pad, so that it may be folded over, with the felt being on the inner side, and the vinyl on the outer side, as indicated in FIG. 3. Each portion 15 and 16 of the vinyl layer formed by the fold is made with slits 17, so as to form straps 18, under which a person may insert his fingers 19a or thumb 19b so as to have a firm grasp of the folded over holder when grasping around an edge 20 of a phonograph record disc 21, as shown in FIG. 1. One portion 15 has the single strip for the thumb, while the other portion 16 has several straps for receiving several of the fingers.

Thus, in operative use, the phonograph record disc may be transferred between an album envelope 22 and a record player turntable (not shown), without any part of the person's hand touching the disc. Additionally, the record handler 10 may be used in an unfolded, flat position, by wiping the soft felt side thereof across the microgrooved surfaces of the phonograph record disc, in order to remove any collected dust.

In a modified design 23 of the invention, shown in FIG. 4, the record handler is made square-shaped, instead of round. In another design 24, shown in FIG. 5, it is irregular-shaped. In still another design 25, shown in FIG. 6, it is rectangular or strip-shaped.

In still another design 26, shown in FIGS. 7 and 8, a record handler is shown which is made with two crossing levers 27, pivotally attached together on a hinge pin 28. One end of each lever forms a handle 29, and the other end forms a pad backing 30, between which portions 15 and 16 of a pad 11 is adhered, for grasping around a record disc therebetween. Each lever is molded of a hard plastic. The fold line 14 aligns with the hinge pin. A spring 31 around the hinge pin normally urges the pads in a closed-together position, and the pads may be urged apart by squeezing the handles together.

Another design of record holder 32, shown in FIGS. 9 and 10, is the same as record holder 10, except that it additionally includes a strip of soft rubber 33 impregnated on the surface of the felt, along the fold line 14, so as to grasp frictionally the edge 20 of the disc. As shown, the soft rubber strip includes a plurality of raised transverse ridges 34, so as to serve as teeth engaging the edge 20. Each alternate ridge slopes toward opposite side edges of the strip, so that, together, the ridges form a V-shaped longitudinal trough along the strip, and which centers the record edge therein. Additionally, as shown, opposite side edges of the pad may be pleated by means of a flexible spring steel sheet interliner 35 between the felt and vinyl, so that stiff teeth 36 formed near outer edges of the interliner, aid to grasp frictionally opposite sides of the disc.

While various changes may be made in the detail construction, it is understood that such changes will be within the spirit and scope of the present invention, as is defined by the appended claims.

What is claimed as new is:

1. A record handler, comprising, in combination, a flat pad formed by a layer of plastic vinyl material on one side thereof and a layer of soft felt material on its other side, said layers being bonded together, a fold line across said pad for folding over said pad with said soft felt material being located on a folded over inner side thereof, a plurality of finger and thumb receiving straps formed on said plastic vinyl layer, said straps being located at both opposite sides from said fold line, and a strip of soft rubber impregnated on a surface of said soft felt along said fold line for frictionally grasping an edge of said phonograph record disc when said holder is folded therearound, said soft rubber strip having a plurality of raised transverse ridges.

2. The combination as set forth in claim 1, wherein opposite side edges of said folded over pad additionally include stiff grasping means for opposite sides of said disc.

* * * * *